United States Patent [19]

Rozman

[11] Patent Number: 5,245,500

[45] Date of Patent: Sep. 14, 1993

[54] 270 VOLT DC SYSTEM WITH TRANSIENT SUPPRESSOR

[75] Inventor: Gregory I. Rozman, Rockford, Ill.

[73] Assignee: Sundstrand Coproratin, Rockford, Ill.

[21] Appl. No.: 783,508

[22] Filed: Oct. 28, 1991

[51] Int. Cl.$^5$ .............................................. H02H 9/04
[52] U.S. Cl. ....................................... 361/56; 361/91; 361/79; 361/92
[58] Field of Search ................... 361/56, 57, 79, 86, 361/87, 91, 111, 92

[56] References Cited

U.S. PATENT DOCUMENTS

| | | | |
|---|---|---|---|
| 4,695,915 | 9/1987 | Mahalek | 361/56 |
| 4,727,448 | 2/1988 | Hanyada et al. | 361/18 |
| 4,849,845 | 7/1989 | Schmitt | 361/56 |
| 4,937,723 | 6/1990 | Rozman et al. | 363/51 |
| 5,132,894 | 7/1992 | Rozman et al. | 363/51 |
| 5,144,517 | 9/1992 | Wieth | 361/111 |
| 5,189,587 | 2/1993 | Haun et al. | 361/56 |

Primary Examiner—Todd E. DeBoer
Attorney, Agent, or Firm—Wood, Phillips, VanSanten, Hoffman & Ertel

[57] ABSTRACT

The problem of noise and undesirable oscillations on a DC bus (46) are minimized using a transient suppressor (50) in connection with a 270 volt DC power system (10). The power system (10) includes an excited generator (17) developing AC power rectified to power the DC bus (46) for connection to loads (36). The transient suppressor (50) comprises a resistor (52) and a switch (54) connecting the resistor (52) across the DC bus (46). A control (60) senses bus voltage and load current and controls the switch (54) in response thereto. Indeed, the switch (54) is controlled in one of two modes of operation. The first mode comprises voltage control in which the switch (54) is turned on with a single pulse to reduce over voltage conditions, without introducing EMI noise. The second mode comprises pulse width modulating the switch (54) under low current conditions to reduce low frequency oscillations on the DC bus (46).

8 Claims, 3 Drawing Sheets

270 VOLT DC SYSTEM WITH TRANSIENT SUPPRESSOR

FIELD OF THE INVENTION

This invention relates to electrical power systems and, more particularly, to a transient suppressor used in connection with a 270 volt DC power system.

1. Background of the Invention

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil.

Aircraft power systems include plural loads to be powered. Such load may include avionics DC loads. The generator comprises a DC exciter followed by a rotating rectifier and a synchronous main generator. The AC power developed in the main generator stator coil is rectified to provide DC power on a DC bus. This DC power, which may be on the order of 270 volts DC, can be provided directly to DC loads.

During load removal, the DC bus may be subject to severe over voltage conditions, which can damage power components connected to the DC bus. To reduce severe over voltage conditions, a transient suppressor is typically included. A transient suppressor comprises a power switch and resistor connected across the DC bus. Typically, the switch is cycled on and off during over voltage conditions. This rapid switching of high power creates undesirable EMI noise. Also, at very light loads, the system may have low frequency oscillations determined by a DC bus filter capacitor.

The present invention is intended to solve one or more of the problems discussed above in a novel and simple manner.

2. Field of the Invention

In accordance with the present invention, an electrical supply having a power source includes a transient suppressor.

It is one object of the invention to provide a transient suppressor operable to reduce EMI noise during operation.

It is yet another object of the invention to provide a transient suppressor which reduces low frequency oscillations at light loads.

Broadly, there is disclosed herein a transient suppressor used in an electrical supply having a power source with two terminals for connection with a load. The transient suppressor comprises voltage sensing means for sensing voltage across the two terminals and current sensing means for sensing current drawn by a load connected to the terminals. A switch connects a resistor across the terminals. A control is connected to the voltage sensing means, the current sensing means and the switch and includes means for controlling the switch in one of two modes of operation. The first mode comprises turning the switch on in response to an over voltage condition as sensed by the voltage sensing means. A second mode comprises turning the switch on in response to an under current condition as sensed by the current sensing means.

It is a feature of the invention that the first mode of operation comprises turning the switch on when the sensed voltage exceeds a first reference value and turning the switch off when the sensed voltage is below a second reference value.

It is another feature of the invention that the second mode comprises modulating the switch when the sensed current is below a reference value.

It is another feature of the invention that the second mode comprises pulse width modulating the switch at a select duty cycle.

It an additional feature of the invention that the control comprises a timeout protection circuit including means for determining a length of time the switch is turned on and time out means for turning off the switch if the length of time exceeds the desired amount.

It is a further feature of the invention that the timeout protection circuit further includes means for determining a length of time the switch is off and a time out means enables turning on the switch when the turn off time exceeds a desired amount relative to the turn on time.

It is still a further feature of the invention that the timeout means comprises a counter having a count value incremented at a first rate if the switch is turned on and decremented at a second rate if the switch is turned off.

It is still another feature of the invention that the first rate is higher than the second rate.

More specifically, the invention relates to a transient suppressor used in connection with a 270 volt DC power system. The power system includes an excited generator developing AC power rectified to power a DC bus for connection to loads. The transient suppressor comprises a resistor and a switch connecting the resistor across the DC bus. A control senses bus voltage and load current and controls the transistor in response thereto. Indeed, the switch is controlled in one of two modes of operation. The first mode comprises voltage control in which the transistor is turned on with a single pulse to reduce over voltage conditions, without introducing EMI noise. The second mode comprises pulse width modulating the switch under low current conditions to reduce low frequency oscillations on the DC bus.

Further features and advantages of the invention will be readily apparent from the specification and from the drawings.

DESCRIPTION OF THE INVENTION

Figure 1:
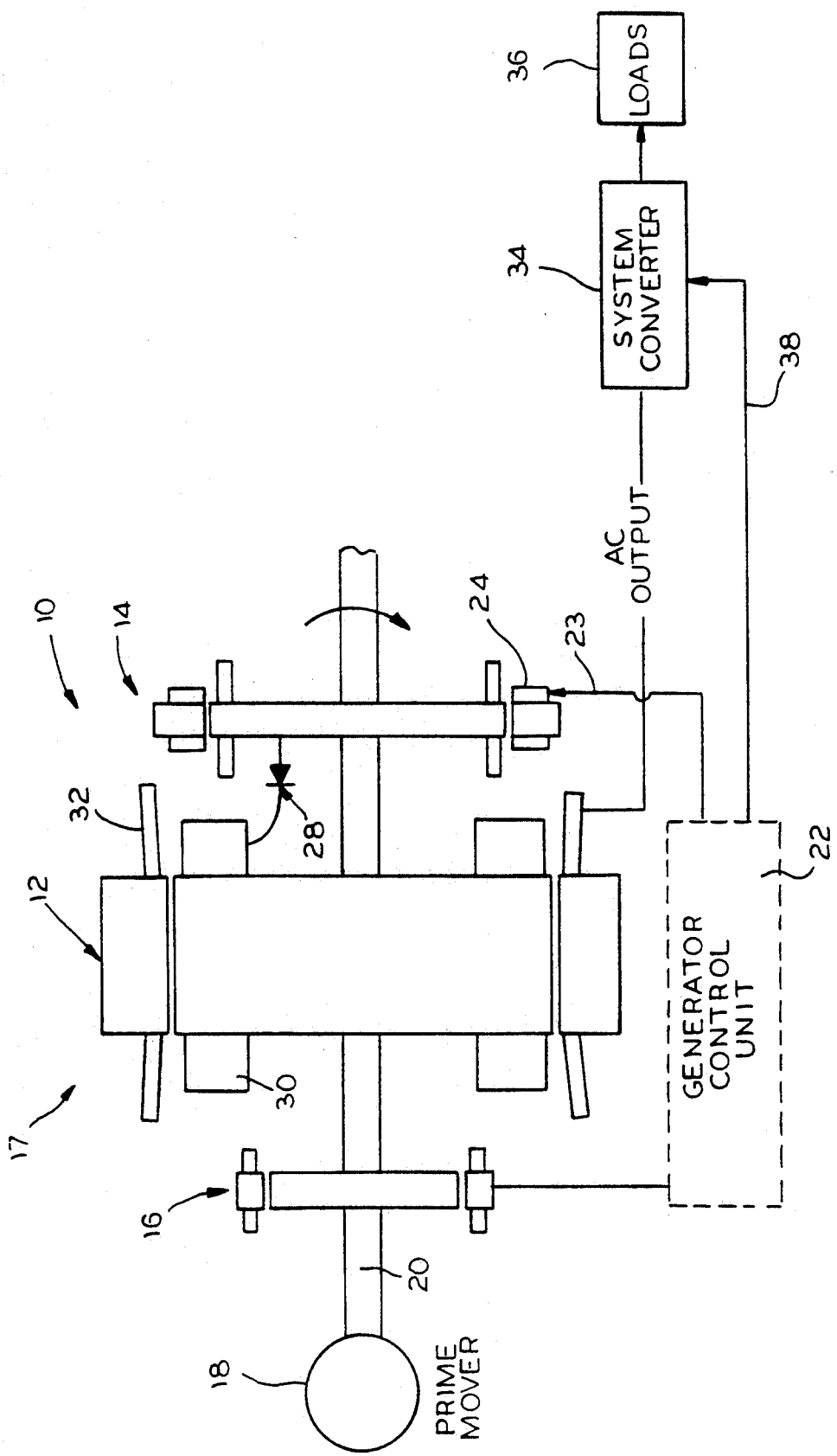
FIG. 1 is a combined diagrammatic illustration-block diagram of an electrical power generating system according to the invention.

Referring first to FIG. 1, an electrical power generating system (EPGS) 10 includes a main generator 12, an exciter 14 for providing main field current to the main generator 12 and a permanent magnet generator (PMG) 16. Each of the main generator 12, exciter 14 and PMG 16, referred to collectively as a generator 17, are driven by a prime mover 18 through a common shaft 20.

A generator control unit (GCU) 22 receives the power developed by the PMG and delivers a controlled current on a line 23 to a DC field winding 24 of the exciter 14. As is conventional in brushless power systems, rotation of the shaft 20 by the prime mover 18 results in generation of a polyphase voltage in armature windings 26 of the exciter 14. This polyphase voltage is rectified by a rotating rectifier bridge, illustrated generally at 28, and the rectified power is coupled to a field winding 30 of the main generator 12. The current in the field winding 30 and the rotation of the shaft 20 sets up a rotating magnetic field in the space occupied by a set of main generator stator windings 32. The stator windings 32 develop polyphase AC output power which is delivered to a system converter 34 for powering loads 36. The system converter 34 is connected to the generator control unit 22 via a line 38 for providing feedback to the generator control unit 22 for control of excitation and operation of the system converter 34, as discussed below.

In a typical application, the prime mover 18 is the main engine in an aircraft, and the system converter 34 is part of a power source which develops 270 volt DC power for powering loads 36.

Figure 2:
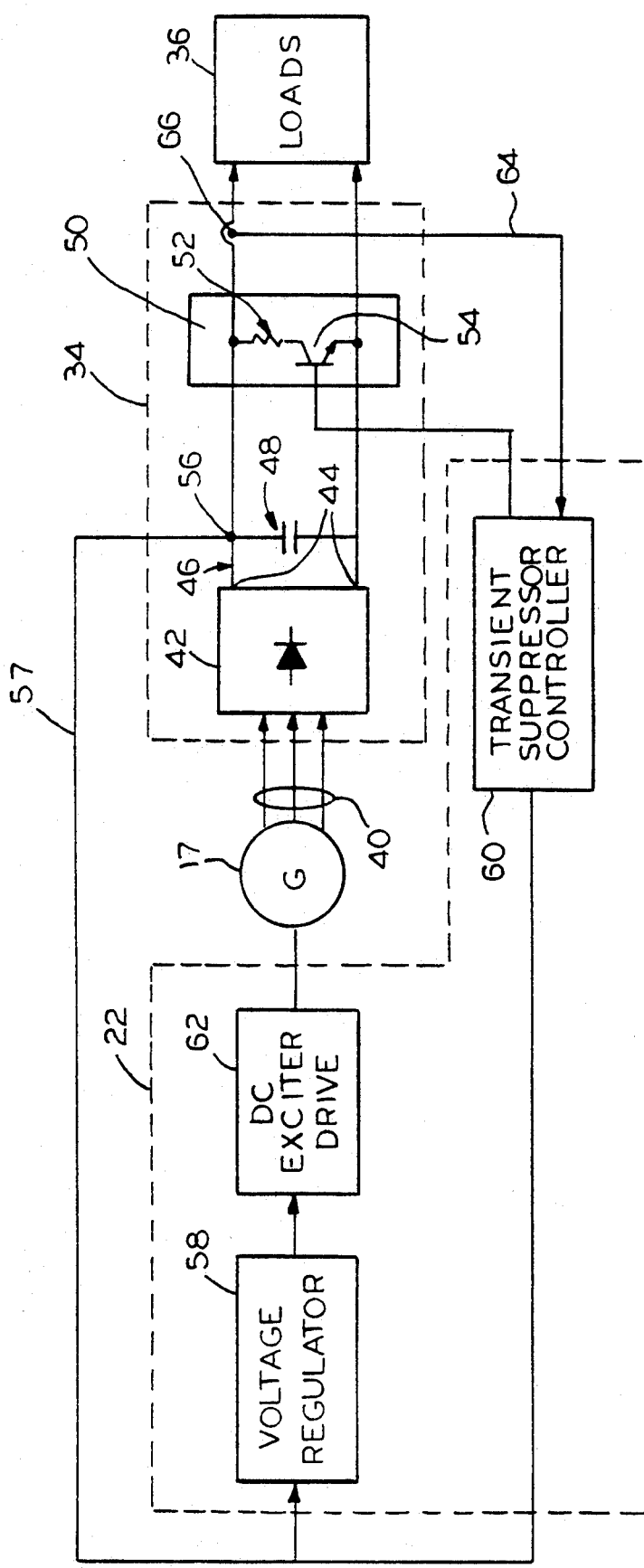
FIG. 2 is a generalized more detailed block diagram of an electrical power generating system according to the invention.

Referring now to FIG. 2, the EPGS 10 is illustrated in greater detail in block diagram form.

The generator 17 develops polyphase output power on a feeder 40 to the system converter 34. The system converter 34 includes an AC/DC converter in the form of a full wave bridge rectifier 42 of conventional construction which is operable to convert three-phase AC power to DC power across terminals 44. The two terminals 44 are connected via a DC bus 46 to power the loads 36. A filter capacitor 48 is connected across the bus 46. A transient suppressor 50 comprises a resistor 52 and switch in the form of a transistor 54 connecting the resistor 52 across the DC bus 46.

A sensor 56 senses DC voltage on the bus 46 and provides feedback to the GCU 22. Particularly, a signal representing the bus voltage is supplied on a line 57 to a voltage regulator 58 and to a transient suppressor controller 60. The voltage regulator 58 is connected via a DC exciter drive 62 for controlling excitation to the generator 17. The transient suppressor controller 60 also receives a signal on a line 64 from a current sensor 66. The current sensor 66 senses current drawn by the loads 36. The transient suppressor controller 60 in turn controls operation of the switch 54.

In accordance with the invention, the transient suppressor controller 60 controls the switch 54 in one of two modes of operation. The first mode comprises voltage control in which the switch 54 is turned on with a single pulse to reduce over voltage conditions, as sensed by the sensor 56, without introducing EMI noise. The second mode comprises pulse width modulating the switch 54 under low current conditions, as determined by the current sensor 66, to reduce low frequency oscillations on the DC bus 46.

Figure 3:
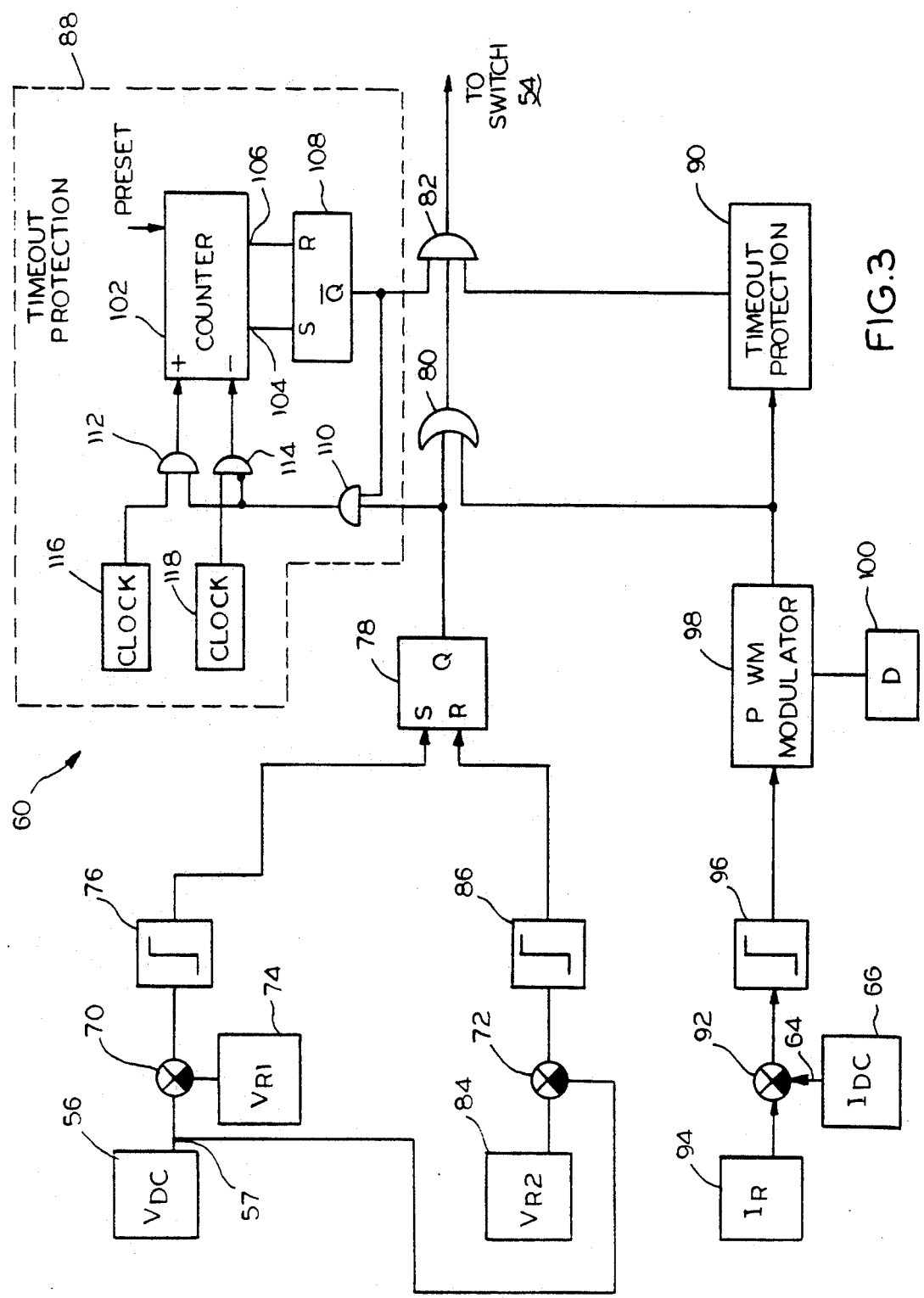
FIG. 3 is a detailed block diagram illustrating a generator control unit and system converter according to the invention.

With reference to FIG. 3, a block diagram illustrates an implementation for the transient suppressor controller 60 of FIG. 2.

The voltage feedback signal from the sensor 56 is connected via the line 57 to first and second summers 70 and 72, respectively. The first summer 70 also receives a first voltage reference value $V_{R1}$ from a block 74. The summer 70 subtracts the reference $V_{R1}$ from the bus voltage and develops an output to a first zero cross detector 76. The output of the zero output detector 76 is connected to the set input of a first flip-flop 78. A non-inverted output, labeled Q, of the flip-flop 78 is connected to an OR gate 80 having its output connected to a first AND gate 82. The AND gate 82 drives the switch 54, see FIG. 2.

A second input to the second summer 72 comprises a second voltage reference $V_{R2}$ from a block 84. The second summer 72 subtracts the bus voltage $V_{DC}$ from the reference $V_{R2}$ and develops an output to a second zero cross detector 86. The second zero cross detector 86 is connected to the reset, or R, input of the flip-flop 78.

With a 270 volt DC system, the voltage across the DC bus 46, i.e. between the terminals 44, is controlled to be 270 volts DC. The first summer 70 is used to detect an over voltage condition such as, for example, the bus voltage exceeding 300 volts DC. The second summer 72 detects when the bus voltage returns to the normal level, i.e. on the order of 270 volts. Thus, when the sensed voltage exceeds the first reference, $V_{R1}$, the flip-flop 78 is set so that its Q output assumes a logic high level. The flip-flop 78 is reset when the bus voltage drops below the second reference $V_{R2}$. Thus, during over voltage conditions, the output from the flip-flop 78 is a logic high, as is also the output from the OR gate 80. The AND gate 82 has additional inputs connected to first and second timeout protection circuits 88 and 90, respectively. Normally, these inputs are logic high, as discussed below. Therefore, during over voltage conditions, the output of the AND gate 82 is high to turn on a transistor 54. The transistor 54 ordinarily remains turned on until the voltage drops below the second reference value $V_{R2}$. This mode comprises voltage control in which the transistor 54 is turned on with a single pulse.

The current sensed by the current sensor 66 is input to a third summer 92. A second input to the summer 92 is connected to a block 94 which develops a current reference $I_R$. The summer 92 subtracts the current feedback value $I_{DC}$ from the reference $I_R$ and the output is passed through a zero cross detector 96. The output of the zero cross detector enables a pulse width modulation (PWM) modulator 98. The output of the PWM modulator provides a second input to the OR gate 80. The PWM modulator operates at a duty cycle D determined by a block 100. This could be a controlled or empirical value to provide a suitable time constant appropriate for the filter capacitor 48 and resistor 52. This latter form of control comprises the pulse width modulating mode which modulates the switch 54 under low current conditions to reduce low frequency oscillations on the DC bus 46. Thus, under normal current conditions this mode is not used. Under low current conditions, the PWM modulator 98 is enabled, thus modulating the switch 54 at the select duty cycle D.

In practice, it is undesirable to maintain the transistor 54 on for extended lengths of time. Therefore, the timeout protection circuits 88 and 90 are operable to protect the switch 54 in the event that the transient suppressor 50 is operated for an extended period of time.

The first timeout protection circuit 88 includes a counter 102 having a first output 104 and a second output 106. The first output 104 represents a higher count value than the second output 106. Typically, the second output 106 would represent a zero count value, i.e. the output is high when the stored count value is equal to zero. The two outputs 104 and 106 are connected respectively to set and reset inputs of a second flip-flop 108. An inverted output from the flip-flop 108 is connected to the first AND gate 82. The inverted output is also connected to a second AND gate 110 which has an additional input connected to the output from the first flip-flop 78. The second AND gate 110 enables the timeout protection circuit 88. The output from the AND gate 110 is connected to an input of a third AND gate 112 and an inverted input of a fourth AND gate 114. An additional input of the third AND gate 112 is connected to a first clock 116. An additional input of the fourth AND gate 114 is connected to a second clock 118. The third AND gate 112 drives an increment input of the counter 102. The fourth AND gate 114 drives a decrement input of the counter 102. In accordance with the invention, the first clock 116 operates at a higher rate on the order of three to four times the clock rate of the second clock 118.

In operation, the counter 102 is initially preset to zero so that the flip-flop 108 is reset causing its inverted output to be high. During normal operating conditions, the output from the first flip-flop 78 is low so that the output from the second circuit AND gate 110 is low as is the output from the third AND gate 112. However, since the enable input to the fourth AND gate 114 is high, since it is inverted, the counter decrement input is pulsed at a rate determined by the second clock 118. However, the counter will remain at the zero value.

During over voltage conditions, the enable output from the second AND gate 110 is high, enabling the third AND gate 112 but disabling the fourth AND gate 114. As a result, the counter increment input is pulsed at a rate determined by the clocking rate of the first clock 116. Thus, the stored count value in the counter 102 will rapidly increase. If the switch 54 remains on for an extended length of time, then the count value will reach the value set for the first output 104 causing the flip-flop 108 to set. When the flip-flop 108 is set, the inverted output goes low to turn off the switch 54. Also, the enable output from the second AND gate 110 is pulled low so that the counter 102 will then be decremented at the slower clock rate. Once the counter value again reaches zero, then the switch 54 will again turn on, unless the over voltage condition has been eliminated.

The timeout protection circuit 90 is similar to the timeout protection circuit 88, discussed above. Therefore, it will not be described in any detail. However, owing to the use of the pulse width modulation control versus the single pulse control, the timing rates of clocks in the timeout protection circuit 90 may be different, as necessary or desired.

Thus, the timeout protection circuit is operable to determine a length of time the switch 54 is turned on and the counter 102 and flip-flop 108 turn off the switch 54 if the length of time exceeds a desired amount. Also, the counter determines a length of time the switch 54 is turned off and a counter 102 and flip-flop 108 enable the turning on of the switch 54 when the turn off time exceeds a desired amount relative to the turn on time. Using the two separate clock rates in connection with the counter provides a memory type circuit. For example, after enabling the switch 54, the counter does not return to zero immediately. Instead it gradually is decremented to zero. If prior to returning to zero, the switch 54 is turned on, then the counter 102 begins counting at an intermediate value so that the time out protection circuit 88 responds more quickly. Such a response satisfies the recognition that heat and such developed in the power components does not instantaneously disappear, but instead gradually dissipates over time.

Summarizing, the transient suppressor circuit in accordance with the invention reduces EMI noise during operation by providing a single pulse mode of operation. A reduction of low frequency oscillations at light loads is achieved by providing pulse width modulation mode during low current conditions. During the PWM mode, the transient suppressor 50 is providing pre-load conditions which bleed the DC bus capacitor 48. The pre-load value is determined by the duty cycle D.

The disclosed embodiment is illustrative of the broad inventive concepts comprehended.

I claim:

1. In an electrical supply having a power source with two terminals for supplying a normal operating voltage and a normal operating current to a load, a transient suppressor comprising:
    voltage sensing means which senses voltage across the two terminals;
    current sensing means which senses current drawn by a load connected to the terminals;
    a resistor and a switch connecting the resistor across the terminals; and
    a control connected to said voltage sensing means, said current sensing means and said switch and including means for controlling said switch in one of two modes of operation, a first mode comprising turning the switch on in response to said voltage exceeding said normal operating voltage as sensed by said voltage sensing means and a second mode comprising turning the switch on in response to said current being below said normal operating current as sensed by said current sensing means.

2. The transient suppressor of claim 1 wherein said first mode of operation comprises turning the switch on when sensed voltage exceeds a first reference value and turning the switch off when the sensed voltage is below a second reference value.

3. The transient suppressor of claim 1 wherein said second mode comprises modulating said switch when sensed current is below a reference value.

4. The transient suppressor of claim 3 wherein said second mode comprises pulse width modulating said switch at a select duty cycle.

5. The transient suppressor of claim 1 wherein said control further comprises a timeout protection circuit including means for determining a length of time the switch is turned on and timeout means for turning off the switch if the length of time exceeds a desired amount.

6. The transient suppressor of claim 5 wherein said timeout protection circuit further includes means for determining a length of time the switch is turned off and said timeout means enables turning on the switch when the turn off time exceeds a desired amount relative to the turn on time.

7. The transient suppressor of claim 6 wherein said timeout means comprises a counter having a count value incremented at a first rate if said switch is turned on and decremented at a second rate if the switch is turned off.

8. The transient suppressor of claim 7 wherein said first rate is higher than said second rate.

* * * * *